(12) United States Patent
Thompson et al.

(10) Patent No.: US 12,127,492 B2
(45) Date of Patent: Oct. 29, 2024

(54) DOWNFORCE CONTROL SYSTEM FOR A ROW CLEANER OF A SEEDING IMPLEMENT

(71) Applicant: CNH Industrial Canada, Ltd., Saskatoon (CA)

(72) Inventors: Dennis George Thompson, Eagle Ridge (CA); Trevor Lawrence Kowalchuk, Saskatoon (CA)

(73) Assignee: CNH Industrial Canada, Ltd. (CA)

( * ) Notice: Subject to any disclaimer, the term of this patent is extended or adjusted under 35 U.S.C. 154(b) by 827 days.

(21) Appl. No.: 17/161,984

(22) Filed: Jan. 29, 2021

(65) Prior Publication Data
US 2022/0240438 A1    Aug. 4, 2022

(51) Int. Cl.
  *A01B 63/114*    (2006.01)
  *A01C 5/06*    (2006.01)
  *A01C 7/00*    (2006.01)
  *A01C 7/20*    (2006.01)

(52) U.S. Cl.
  CPC ............ *A01B 63/114* (2013.01); *A01C 5/064* (2013.01); *A01C 5/068* (2013.01); *A01C 7/006* (2013.01); *A01C 7/205* (2013.01)

(58) Field of Classification Search
  CPC ....... A01B 63/114; A01B 63/32; A01B 49/06; A01C 5/068; A01C 5/064; A01C 7/006; A01C 7/205
  See application file for complete search history.

(56) References Cited

U.S. PATENT DOCUMENTS

| 4,785,890 | A  | * | 11/1988 | Martin | ................. | A01C 7/006 |
|     |    |   |         |        |     | 111/139     |
| 6,098,722 | A  | * | 8/2000  | Richard | ................ | A01B 35/30 |
|     |    |   |         |        |     | 111/151     |
| 6,345,671 | B1 |   | 2/2002  | Siemens et al. | | |
| 6,494,154 | B2 | * | 12/2002 | Kinzenbaw et al. | .... | A01C 7/04 |
|     |    |   |         |        |     | 172/311     |

(Continued)

OTHER PUBLICATIONS

Siemens et al., "Development and Evaluation of a Residue Management Wheel for Hoe-Type No-Till Drills," The Society for Engineering in Agricultural, Food, and Biological Systems, Annual International Meeting, Jul. 27-30, 2003, 9 pgs, Las Vegas, Nevada.

(Continued)

*Primary Examiner* — Thomas B Will
*Assistant Examiner* — Joel F. Mitchell
(74) *Attorney, Agent, or Firm* — Rebecca Henkel; Peter K. Zacharias; Rickard K. DeMille (57) ABSTRACT

A row unit of a seeder includes a frame configured to be coupled to a toolbar of the seeder. The row unit also includes a single opener pivotally or rotatably coupled to the frame. The row unit further includes a row cleaner assembly that has a row cleaner arm pivotally coupled to the frame or to the single opener and a row cleaner blade rotatably coupled to the row cleaner arm. The row cleaner arm positions a respective rotational axis of the row cleaner blade forward of the single opener relative to a direction of travel of the row unit. A row cleaner actuator is coupled to the row cleaner arm, and the row cleaner actuator is configured to control a first downforce applied by the row cleaner blade to soil.

14 Claims, 4 Drawing Sheets

(56) References Cited

U.S. PATENT DOCUMENTS

| | | | |
|---|---|---|---|
| 7,086,342 B2* | 8/2006 | O'Neall et al. | A01C 15/005 |
| | | | 111/900 |
| 7,669,536 B2* | 3/2010 | Martin | A01C 7/006 |
| | | | 111/926 |
| 8,408,149 B2 | 4/2013 | Rylander | |
| 8,479,669 B2 | 7/2013 | Shoup | |
| 8,522,889 B2* | 9/2013 | Adams et al. | A01B 61/048 |
| | | | 111/163 |
| 8,763,713 B2 | 7/2014 | Bassett | |
| 8,826,836 B2 | 9/2014 | Van Buskirk et al. | |
| 9,137,939 B2 | 9/2015 | Winick et al. | |
| 9,743,572 B2 | 8/2017 | Martin | |
| 9,801,332 B2 | 10/2017 | Landphair et al. | |
| 10,091,921 B2 | 10/2018 | Bruck et al. | |
| 10,104,830 B2 | 10/2018 | Heathcote | |
| 10,238,024 B2 | 3/2019 | Bassett | |
| 10,251,324 B2 | 4/2019 | Martin et al. | |
| 10,309,427 B2 | 6/2019 | Sauder et al. | |
| 2018/0054953 A1 | 3/2018 | Martin | |
| 2018/0206393 A1 | 7/2018 | Stoller et al. | |
| 2019/0183036 A1* | 6/2019 | Leimkuehler et al. | |
| | | | A01C 5/062 |
| 2020/0156470 A1* | 5/2020 | Stanhope et al. | A01B 79/02 |
| 2020/0329627 A1* | 10/2020 | Johnson et al. | A01B 35/32 |
| 2020/0344937 A1* | 11/2020 | Sauder et al. | A01B 73/065 |
| 2020/0383262 A1* | 12/2020 | Schoeny et al. | A01C 14/00 |
| 2021/0190754 A1* | 6/2021 | Stoller et al. | A01C 7/20 |
| 2022/0232753 A1* | 7/2022 | Van De Woestyne et al. | |
| | | | G06T 7/0002 |

OTHER PUBLICATIONS

Yetter Farm Equipment, 2966-002 "Row Cleaner for 60/90 Opener", 3 pgs; accessed Jan. 5, 2021, https://www.yetterco.com/products/39-seeder-row-cleaners/82-2966002-row-cleaner-for-6090-opener.

Yetter Farm Equipment, 2966-002A "Air Adjust™ Row Cleaner For 60/90 Opener," 4 pgs, accessed Jan. 5, 2021, https://www.yetterco.com/products/39-seeder-row-cleaners/359-2966002a-air-adjust-row-cleaner-for-6090-opener.

Aricks Wheel Crop Residue Manager for John Deere Seeder—Aricks Australia, "Aricks Wheel: Row Cleaner/Residue Manager," 5 pgs, accessed Jan. 5, 2021, https://www.bprengineering.com.au/aricks-wheel.html.

Presicion Planting, "CleanSweep: Easy Row Cleaner Adjustments", 10 pgs, accessed Jan. 22, 2021, https://www.precisionplanting.com/products/product/cleansweep.

* cited by examiner

DOWNFORCE CONTROL SYSTEM FOR A ROW CLEANER OF A SEEDING IMPLEMENT

BACKGROUND

The present disclosure relates generally to a downforce control system for a row cleaner of a seeding implement.

Generally, a seeding implement (e.g., seeder) is towed behind a tractor or other work vehicle via a mounting bracket secured to a rigid frame of the seeding implement. The seeding implement typically includes multiple row units distributed across a width of the seeding implement. Each row unit is configured to deposit seeds at a target depth beneath a soil surface of a field, thereby establishing rows of planted seeds. For example, each row unit typically includes a ground engaging tool (e.g., opener) that forms a seeding path (e.g., trench) for seed deposition into the soil. A seed tube (e.g., coupled to the ground engaging tool) is configured to deposit seeds and/or other agricultural products (e.g., fertilizer) into the trench. The ground engaging tool and the seed tube may be followed by at least one wheel, such as a closing wheel that moves displaced soil back into the trench and/or a packer wheel that packs the soil on top of the deposited seeds.

SUMMARY

In one embodiment, row unit of a seeder includes a frame configured to be coupled to a toolbar of the seeder. The row unit also includes a single opener pivotally or rotatably coupled to the frame. The row unit further includes a row cleaner assembly that has a row cleaner arm pivotally coupled to the frame or to the single opener and a row cleaner blade rotatably coupled to the row cleaner arm. The row cleaner arm positions a respective rotational axis of the row cleaner blade forward of the single opener relative to a direction of travel of the row unit. A row cleaner actuator is coupled to the row cleaner arm, and the row cleaner actuator is configured to control a first downforce applied by the row cleaner blade to soil.

In one embodiment, a row unit of a seeder includes a frame configured to be coupled to a toolbar of the seeder. The row unit also includes an opener pivotally or rotatably coupled to the frame. The row unit further includes a row cleaner assembly that has a row cleaner arm pivotally coupled to the frame or to the opener, a row cleaner blade rotatably coupled to the row cleaner arm, and a row cleaner actuator coupled to the row cleaner arm. The row cleaner actuator is configured to control a first downforce applied by the row cleaner blade to soil in a field. The row unit also includes a controller configured to receive a signal indicative of a residue characteristic of residue in the field, determine a target downforce for the row cleaner blade based on the residue characteristic of the residue in the field, and output a control signal to adjust the row cleaner actuator to maintain the first downforce applied by the row cleaner blade to the soil in the field within a threshold range of the target downforce for the row cleaner blade.

In one embodiment, a method of operating a row unit for a seeder includes linking a frame of the row unit to a toolbar of the seeder. The method also includes positioning a single opener in contact with soil in a field, wherein the single opener is pivotally or rotatably coupled to the frame. The method also includes positioning a row cleaner blade in contact with the soil in the field, wherein the row cleaner blade is rotatably coupled to a row cleaner arm, and the row cleaner arm is pivotally coupled to the frame or to the single opener. The method further includes controlling a valve assembly to adjust a flow and/or a pressure of fluid to a row cleaner actuator that is coupled to the row cleaner arm to thereby adjust a first downforce applied by the row cleaner blade to the soil in the field.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
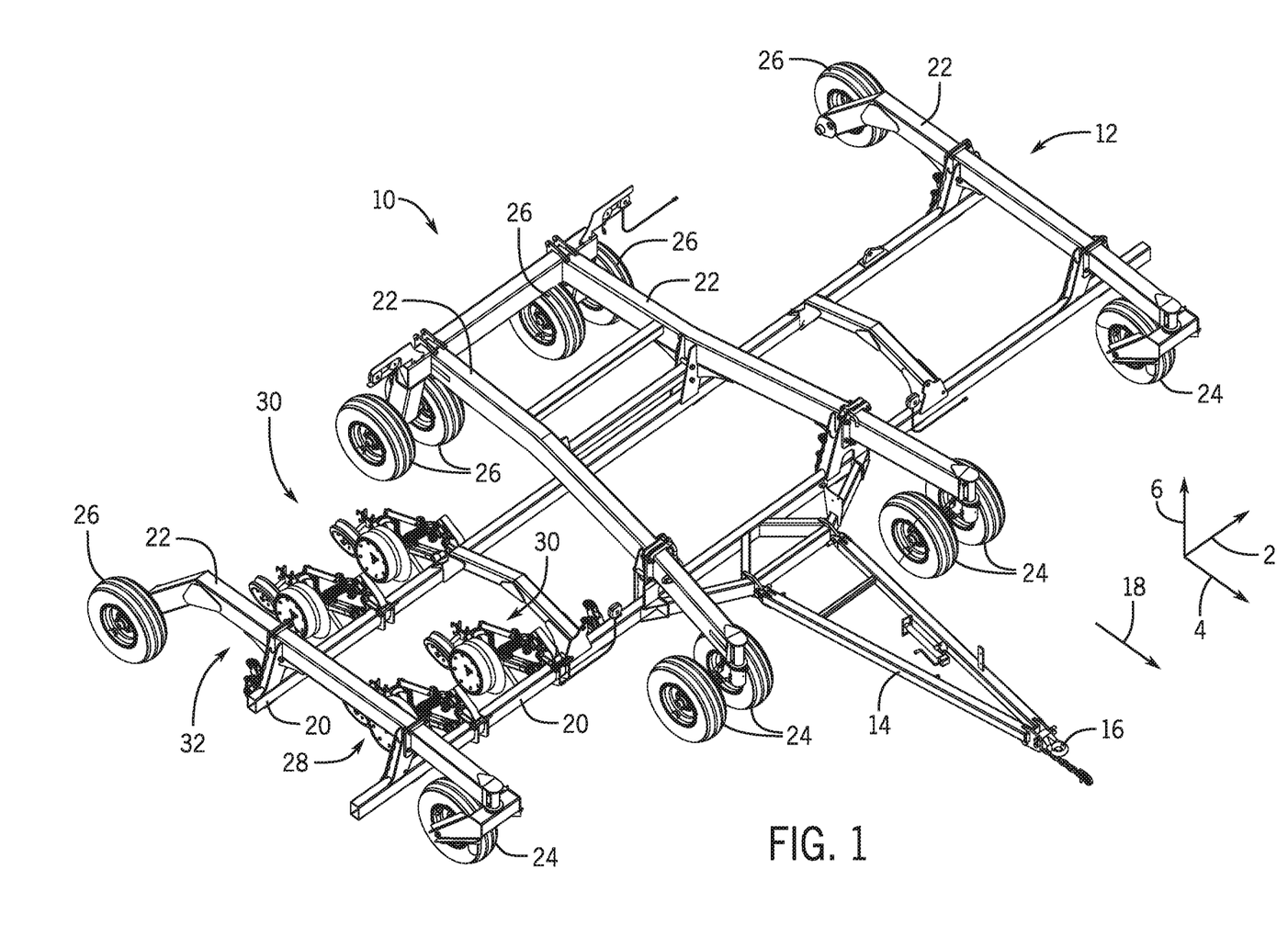
FIG. 1 is a perspective view of an embodiment of an agricultural seeding implement.

FIG. 1 is a perspective view of an embodiment of an agricultural seeding implement 10 (e.g., seeder). As illustrated, the agricultural seeding implement 10 includes a frame 12 and a tow bar 14 coupled to the frame 12. In the illustrated embodiment, the tow bar 14 is pivotally coupled to the frame 12 and includes a hitch 16. The hitch 16 is configured to interface with a corresponding hitch of a work vehicle (e.g., tractor), thereby enabling the work vehicle to tow the agricultural seeding implement 10 through a field along a direction of travel 18.

It should be appreciated that the tow bar 14 may have any suitable configuration (e.g., A-frame; a single bar extending along the direction of travel) and may be either pivotally or rigidly coupled to the frame 12. In addition, the agricultural seeding implement 10 may carry or be coupled to an air cart (e.g., via the hitch 16, and then the air cart may be coupled to the work vehicle such that the agricultural seeding implement 10 and the air cart are towed together by the work vehicle) that provides agricultural products (e.g., seeds, fertilizer) to the agricultural seeding implement 10 for distribution to into soil in the field. Furthermore, the agricultural seeding implement 10 may be towed by the work vehicle or may itself be part of a self-propelled vehicle (e.g., in which the frame of the agricultural seeding implement 10 is coupled to a main frame/chassis of the self-propelled vehicle). Regardless of the configuration, the agricultural seeding implement 10 may travel via operator control or via autonomous control. For example, the agricultural seeding implement 10 may be towed by the work vehicle that operates under control of an operator in a cab of the work vehicle or that operates autonomously (e.g., autonomously or semi-autonomously via a control system executing autonomous driving algorithms). It should be appreciated that various configurations and arrangements of the agricultural seeding implement 10 are envisioned. For example, the air cart may be towed behind the agricultural seeding implement 10. As another example, the air cart may be mounted on the agricultural seeding implement 10 (e.g., on the frame 12; a mounted tank disk drill).

In the illustrated embodiment, the frame 12 of the agricultural seeding implement 10 includes two toolbars 20 and four supports 22. Wheels are coupled to the supports 22, and the supports 22 are coupled to the toolbars 20 (e.g., via fasteners, via a welded connection). In particular, front wheel(s) 24 are rotatably coupled to a respective front portion of each support 22, and rear wheel(s) 26 are rotatably coupled to a respective rear portion of each support 22. The wheels maintain the supports 22 above the surface of the field and enable the agricultural seeding implement 10 to move along the direction of travel 18. Pivotal connections between the front wheels 24 and the respective supports 22 enable the front wheels 24 to caster, thereby enhancing the turning ability of the agricultural seeding implement 10 (e.g., at a headland, during transport). The frame 12 of the agricultural seeding implement 10 may have any number of supports 22 (e.g., 0, 1, 2, 3, 4, 5, 6, or more). Furthermore, in certain embodiments, the toolbars 20 of the frame 12 may be supported by other and/or additional suitable structures (e.g., connectors extending between toolbars, wheel mounts coupled to toolbars). In the illustrated embodiment, a first row 28 of row units 30 is coupled to the front toolbar 20, and a second row 32 of row units 30 is coupled to the rear toolbar 20. The agricultural seeding implement 10 may have any number of toolbars 20 (e.g., 1, 2, 3, 4, 5, 6, or more) and corresponding rows of row units 30.

In the illustrated embodiment, each row unit 30 of the agricultural seeding implement 10 is configured to deposit the agricultural product into the soil. For example, certain row units 30 (e.g., all of the row units 30 of the agricultural seeding implement 10, a portion of the row units 30 of the agricultural seeding implement 10, at least one row unit 30 of the agricultural seeding implement 10) include an opener disc configured to form a trench within the soil for agricultural product deposition into the soil. The row unit 30 also includes a gauge wheel (e.g., positioned adjacent to the opener disc) configured to control a penetration depth of the opener disc into the soil. For example, the opener disc may be rotatably and non-movably coupled to a frame of the row unit, and the gauge wheel may be movably coupled to the frame and configured to contact a surface of the soil during operation of the row unit. Accordingly, adjusting the vertical position of the gauge wheel relative to the frame of the row unit controls the penetration depth of the opener disc into the soil. In addition, the row unit includes a product tube (e.g., seed tube) configured to deposit the agricultural product into the trench formed by the opener disc.

In certain embodiments, the agricultural seeding implement and/or at least one row unit of the agricultural seeding implement includes a downforce actuator configured to control a downforce applied by the gauge wheel to the soil surface. For example, in certain embodiments, the agricultural seeding implement may include multiple downforce actuators each configured to control the downforce applied by the gauge wheels of a group of row units (e.g., on a sub-frame/sub-bar) coupled to the downforce actuator. The downforce actuator may enable the downforce applied by the respective gauge wheel(s) to the soil surface to be adjusted based on soil condition(s), soil type, agricultural product type (e.g., seed type, fertilizer type), other suitable parameter(s), or a combination thereof. For example, the downforce may be reduced for moist soil conditions to reduce compaction, and the downforce may be increased for harder soil to enable the gauge wheel(s) to maintain contact with the soil surface.

In the illustrated embodiment, the opener disc/agricultural product tube is preceded by a row cleaner assembly configured to remove and/or break up debris (e.g., residue). The row cleaner assembly may include a row cleaner arm pivotally coupled to the frame of the row unit; however, it should be appreciated that the row cleaner arm may be coupled (e.g., directly attached) to another structure, such as the toolbar 20. Indeed, because the row unit 30 may move up and down during operation, it may be advantageous to couple the row cleaner arm to the toolbar 20 in order to provide independent movement of the row cleaner assembly and the opener disc.

The row cleaner assembly also includes at least one row cleaner blade (e.g., toothed disc) rotatably coupled to the row cleaner arm. The row cleaner arm positions a rotational axis of the at least one row cleaner blade forward of a rotational axis of the opener disc relative to the direction of travel 18. In addition, the row cleaner assembly includes a row cleaner actuator coupled to the frame and to the row cleaner arm. The row cleaner actuator is configured to control a downforce applied by the at least one row cleaner blade to the soil. Because the row cleaner arm is configured to rotate relative to the frame, the row cleaner actuator may control the contact force between the at least one row cleaner blade and the soil substantially independently of the contact force between the gauge wheel and the soil. For example, each contact force may be adjusted for particular field conditions (e.g., soil composition, soil moisture, residue depth). As a result, the row cleaner assembly disclosed herein may enable more efficient and/or effective seeding operations. For example, the at least one row cleaner blade may remove and/or break up the debris, which may reduce clogs at the opener disc, which in turn may reduce breaks in seeding operations to remove the clogs at the opener disc.

The opener disc/agricultural product tube may be followed by a closing system. In the illustrated embodiment, the closing system includes a packer assembly having a packer wheel configured to pack soil on top of the deposited agricultural product. It should be appreciated that the closing system may also be adapted to include a closing disc between the opener disc/agricultural product tub and the packer wheel along the direction of travel 18. In certain embodiments, each row unit 30 of the second row 32 is laterally offset (e.g., offset in a lateral direction perpendicular to the direction of travel 18) from a respective row unit 30 of the first row 28, such that two adjacent rows of agricultural product are established within the soil. While the illustrated agricultural seeding implement 10 includes two row units 30 in the first row 28 and two row units 30 in the second row 32 for illustrative purposes, the agricultural seeding implement may have any suitable number of row units in the first row and any suitable number of row units in the second row. For example, the agricultural seeding implement may include 5, 10, 15, 20, 25, or 30 row units in the first row and a corresponding number of row units in the second row. Furthermore, in certain embodiments, the second row may include more or fewer row units than the first row. To facilitate discussion, the agricultural seeding implement and its components (e.g., the row unit 30) may be described with reference to a lateral axis or direction 2, a longitudinal axis or direction 4, and/or a vertical axis or direction 6.

Figure 2:
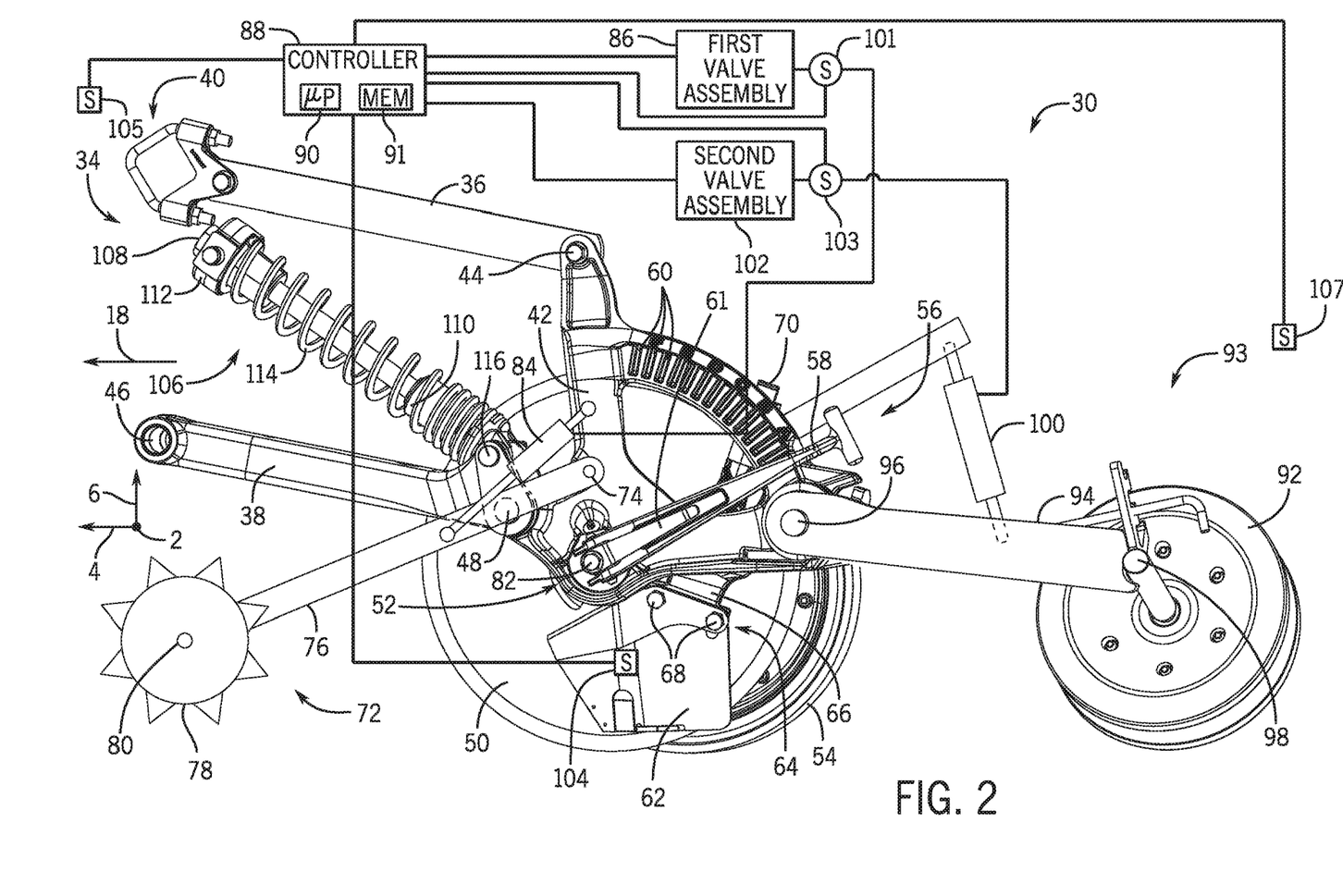
FIG. 2 is a side view of an embodiment of a row unit that may be employed within the agricultural seeding implement of FIG. 1.

FIG. 2 is a side view of an embodiment of a row unit 30 that may be employed within the agricultural seeding implement of FIG. 1. In the illustrated embodiment, the row unit 30 includes a linkage assembly 34 configured to couple (e.g., movably couple) the row unit 30 to a respective toolbar of the agricultural seeding implement. The linkage assembly 34 includes an upper link 36 and a lower link 38. A mount 40 is positioned at a first end of the upper link 36 and is configured to couple to the respective toolbar of the agricultural seeding implement. In addition, a second end of the upper link 36 is coupled to a frame 42 of the row unit 30 by a fastener 44. The lower link 38 includes an opening 46 configured to receive a fastener that rotatably couples the lower link 38 to the respective toolbar (e.g., via a rockshaft that is rotatably coupled to the respective toolbar). In addition, a second end of the lower link 38 is coupled to the frame 42 of the row unit by a fastener (e.g., pin) 48. It should be appreciated that the row unit 30 may include any of a variety of different types of linkages or linkage assemblies to couple the row unit 30 to the toolbar (e.g., a single arm or link).

The linkage assembly 34 enables the frame 42 of the row unit 30 to move vertically (e.g., raise and lower in the vertical direction 6) relative to the respective toolbar (e.g., in response to the opener disc/gauge wheel contacting an obstruction, in response to variations in the terrain, for raising the row unit frame for transport). It should be appreciated that the row unit may include any other suitable linkage configuration to facilitate vertical movement of the row unit frame relative to the respective toolbar. Furthermore, in certain embodiments, the row unit frame may be non-movably coupled to the respective toolbar.

In the illustrated embodiment, the row unit 30 includes an opener disc 50 (e.g., opener; opener device) rotatably and non-movably coupled to the frame 42 by a bearing assembly 52. The bearing assembly 52 enables the opener disc 50 to freely rotate as the opener disc 50 engages the soil, thereby enabling the opener disc 50 to excavate a trench within the soil. In the illustrated embodiment, the row unit 30 includes a gauge wheel 54 configured to control a penetration depth of the opener disc 50 into the soil. The gauge wheel 54 is configured to rotate along the surface of the soil. Accordingly, adjusting the vertical position of the gauge wheel 54 relative to the frame 42 controls the penetration depth of the opener disc 50 into the soil. The gauge wheel 54 is rotatably coupled to a gauge wheel support arm, and the gauge wheel support arm is pivotally coupled to the frame 42. Accordingly, pivoting of the gauge wheel support arm drives the gauge wheel 54 to move vertically relative to the frame 42. In certain embodiments, the gauge wheel 54 is positioned against the opener disc 50 to remove soil from a side of the opener disc 50 during operation of the row unit 30.

The row unit 30 includes a depth adjustment assembly 56 configured to control the vertical position of the gauge wheel 54, thereby controlling the penetration depth of the opener disc 50 into the soil. In the illustrated embodiment, the depth adjustment assembly 56 includes a depth adjustment handle 58 and depth gauge notches 60. The depth adjustment handle 58 is non-rotatably coupled to the gauge wheel support arm and configured to drive the gauge wheel support arm to pivot, thereby controlling the vertical position of the gauge wheel 54 relative to the frame 42/opener disc 50. The depth adjustment handle 58 may be moved to any of the depth gauge notches 60 to adjust the vertical position of the gauge wheel 54. The depth gauge notches 60 block rotation of the depth adjustment handle 58, thereby maintaining the vertical position of the gauge wheel 54 (e.g., substantially fixing the position of the gauge wheel 54 relative to the frame 42). To adjust the vertical position of the gauge wheel 54/penetration depth of the opener disc 50, the depth adjustment handle 58 may be moved away from the depth gauge notches 60, thereby facilitating rotation of the depth adjustment handle 58 along the depth gauge notches 60. Upon release of the depth adjustment handle 58, a biasing member 61 may urge the depth adjustment handle 58 to engage the depth gauge notches 60, thereby blocking rotation of the depth adjustment handle 58 among the depth gauge notches 60. It should be appreciated that any other suitable depth adjustment assembly/device, such as an actuator, may be used to control the vertical position of the gauge wheel/penetration depth of the opener disc.

In the illustrated embodiment, the row unit 30 includes a scraper 62 disposed adjacent to the opener disc 50 and configured to remove accumulated soil from the opener disc 50. As illustrated, a mounting portion 64 of the scraper 62 is rigidly coupled to a mounting bracket 66 by fasteners 68. In alternative embodiments, the scraper may be coupled directly to the frame, or the scraper may be mounted to another suitable mounting structure. In the illustrated embodiment, the mounting bracket 66 is pivotally coupled to the frame 42 by a shaft, and a biasing member urges the bracket 66/scraper 62 toward the opener disc 50, thereby facilitating debris removal. While the illustrated row unit includes a scraper, in other embodiments, the scraper may be omitted. Furthermore, the row unit 30 includes an agricultural product tube 70 (e.g., seed tube) configured to direct agricultural product into the trench formed by the opener disc 50.

In the illustrated embodiment, the row unit 30 includes a row cleaner assembly 72 configured to remove and/or break up debris (e.g., residue) in front of the opener disc 50. The row cleaner assembly 72 includes a row cleaner arm 76 and a row cleaner blade 78 rotatably coupled to the row cleaner arm 76. As illustrated, the row cleaner arm 76 is pivotally coupled to the frame 42 at a pivot joint 74 (e.g., first pivot joint), and the row cleaner arm 76 positions a rotational axis 80 of the row cleaner blade 78 forward of a rotational axis 82 of the opener disc 50 relative to the direction of travel 18 of the row unit 30. The row cleaner blade 78 is configured to remove and/or break up debris, thereby clearing a path and enhancing an ability of the opener disc 50 to form the trench. In the illustrated embodiment, the row cleaner blade 78 includes radially-extending (e.g., outwardly-extending) spikes or teeth. However, in other embodiments, the row cleaner blade may be devoid of the spikes or teeth (e.g., smooth).

Furthermore, the row cleaner assembly 72 may include any number of row cleaner blades 78 (e.g., 1, 2, 3, 4, or more). Thus, the row cleaner assembly 72 may include a single row cleaner blade, or the row cleaner assembly 72 may include additional row cleaner blade(s) (e.g., distributed along the direction of travel and/or positioned side-by-side). For example, a first row cleaner blade and a second row cleaner blade may be laterally offset from one another to be positioned side-by-side at an end portion of the row cleaner arm 76 (e.g., rotatably mounted on an axle at the end portion of the row cleaner arm 76). In addition, the rotational axis 80 of the row cleaner blade 78 may be oriented at any suitable angle relative to the direction of travel and/or the vertical axis 6 (e.g., to facilitate removing and/or breaking up the debris). Where multiple row cleaner blades are provided, the respective rotational axes 80 may be the same (e.g., aligned, coaxial) or different (e.g., angled with respect to one another, such as to form a v-shape; laterally and/or longitudinally offset with respect to one another). In certain embodiments, the angle of the row cleaner blade (e.g., the rotational axis of the row cleaner blade) relative to the direction of travel and/or the vertical axis may be adjustable (e.g., via an actuator; based on operator input and/or based on sensor data, such as sensor data indicative of residue characteristics of residue in the field).

In the illustrated embodiment, the row cleaner assembly 72 includes a row cleaner actuator 84 (e.g., first fluid actuator; hydraulic cylinder, hydraulic motor, pneumatic cylinder, pneumatic motor) coupled to the row cleaner arm 76 and to the frame 42. The row cleaner actuator 84 is configured to control a downforce applied by the row cleaner blade 78 to the soil. Accordingly, the downforce applied by the row cleaner blade 78 to the soil may be increased by increasing the fluid pressure within the row cleaner actuator 84, and the downforce applied by the row cleaner blade 78 to the soil may be decreased by decreasing the fluid pressure within the row cleaner actuator 84. Furthermore, in the illustrated embodiment, a first valve assembly 86 is fluidly coupled to the row cleaner actuator 84. The first valve assembly 86 is configured to control the fluid pressure within the row cleaner actuator 84, thereby controlling the downforce applied by the row cleaner blade 78 to the soil.

In addition, a controller 88 is communicatively coupled to the first valve assembly 86. The controller 88 is configured to output a first output signal to the first valve assembly 86 indicative of instructions to control the row cleaner actuator 84. The controller 88 may be located in/on the agricultural seeding implement, in/on an air cart coupled to the agricultural seeding implement, in/on a work vehicle coupled to the agricultural seeding implement, or in any other suitable location that enables the controller 88 to perform the operations described herein. It should also be appreciated that a respective controller may be provided for each row unit 30 (e.g., to control each row unit separately), a respective controller may be provided for a subset of row units (e.g., some of the row units; to control some of the row units together), or the controller may be provided for all of the row units (e.g., to control all of the row units together).

In certain embodiments, the controller 88 is an electronic controller having electrical circuitry configured to control the first valve assembly 86. In the illustrated embodiment, the controller 88 includes a processor, such as the illustrated microprocessor 90, and a memory device 91. The controller 88 may also include one or more storage devices and/or other suitable components. The processor 90 may be used to execute software, such as software for controlling the first valve assembly, and so forth. Moreover, the processor 90 may include multiple microprocessors, one or more "general-purpose" microprocessors, one or more special-purpose microprocessors, and/or one or more application specific integrated circuits (ASICS), or some combination thereof. For example, the processor 90 may include one or more reduced instruction set (RISC) processors.

The memory device 91 may include a volatile memory, such as random access memory (RAM), and/or a nonvolatile memory, such as read-only memory (ROM). The memory device 91 may store a variety of information and may be used for various purposes. For example, the memory device 91 may store processor-executable instructions (e.g., firmware or software) for the processor 90 to execute, such as instructions for controlling the first valve assembly 86, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the first valve assembly), and any other suitable data.

While the row cleaner actuator 84 includes the first fluid actuator in the illustrated embodiment, in other embodiments, the row cleaner actuator may include another or an alternative suitable actuating device, such as an electromechanical actuator, a linear actuator, or an electric motor. In such embodiments, the actuating device may be directly communicatively coupled to the controller. Furthermore, while the row cleaner actuator 84 includes a single actuating device (e.g., the first fluid actuator) in the illustrated embodiment, in other embodiments, the row cleaner actuator may include multiple actuating devices (e.g., of the same type or of different types). The row cleaner actuator 84 may also be a single-acting actuator (e.g., downward force only), and upward movement of the row unit 30 (e.g., to raise for turns/headlands) is utilized to drive the row cleaner blade 78 upward, or the row cleaner actuator 84 may be a dual-acting actuator (e.g., downward force and upward force, such as to raise the row cleaner blade 78 for headland turns or transporting).

As shown, the row unit 30 also includes a packer assembly 93 configured to close the trench formed by the opener disc 50 and to pack soil on top of the deposited agricultural product. The packer assembly 93 includes a packer wheel 92 and a packer wheel arm 94. The packer wheel arm 94 is pivotally coupled to the frame 42 at a pivot joint 96 (e.g., second pivot joint), and the packer wheel 92 is rotatably coupled to the packer wheel arm 94. The soil-contacting surface of the packer wheel may have any suitable shape (e.g., v-shaped, flat) and/or any suitable tread pattern (e.g., chevron treads). In addition, the packer wheel arm 94 positions a rotational axis 98 of the packer wheel 92 rearward of the rotational axis 82 of the opener disc 50 relative to the direction of travel 18 of the row unit 30.

In the illustrated embodiment, the packer wheel arm 94 and the row cleaner arm 76 are configured to rotate independently of one another relative to the frame 42. Accordingly, rotation of the packer wheel arm 94 (e.g., in response to contact between the packer wheel and an obstruction) does not directly affect rotation of the row cleaner arm 76, and rotation of the row cleaner arm 76 (e.g., in response to contact between the row cleaner blade 78 and an obstruction) does not directly affect rotation of the packer wheel arm 94. In addition, independent rotation of the row cleaner arm 76 and the packer wheel arm 94 enables the contact force between the row cleaner blade 78 and the soil to be adjusted independently of the contact force between the packer wheel 92 and the soil.

In the illustrated embodiment, the packer assembly 93 includes a packer wheel actuator 100 (e.g., second fluid actuator; hydraulic cylinder, hydraulic motor, pneumatic cylinder, pneumatic motor) coupled to the packer wheel arm 94 and to the frame 42. The packer wheel actuator 100 is configured to control a downforce applied by the packer wheel 92 to the soil. Accordingly, the downforce applied by the packer wheel 92 to the soil may be increased by increasing the fluid pressure within the packer wheel actuator 100, and the downforce applied by the packer wheel to the soil may be decreased by decreasing the fluid pressure within the packer wheel actuator 100. Furthermore, a second valve assembly 102 is fluidly coupled to the packer wheel actuator 100. The second valve assembly 102 is configured to control the fluid pressure within the packer wheel actuator 100, thereby controlling the downforce applied by the packer wheel 92 to the soil. In addition, the controller 88, which is communicatively coupled to the second valve assembly 102, is configured to output a second output signal to the second valve assembly 102 indicative of instructions to control the packer wheel actuator 100.

While the packer wheel actuator 100 includes the second fluid actuator in the illustrated embodiment, in other embodiments, the packer wheel actuator may include another or an alternative suitable actuating device, such as an electromechanical actuator, a linear actuator, or an electric motor. In such embodiments, the actuating device may be directly communicatively coupled to the controller. Furthermore, while the packer wheel actuator 100 includes a single actuating device (e.g., the first fluid actuator) in the illustrated embodiment, in other embodiments, the packer wheel actuator may include multiple actuating devices (e.g., of the same type or of different types).

In certain embodiments, the controller 88 is configured to determine the instructions to control the row cleaner actuator 84 based at least in part on a first determined contact force between the row cleaner blade 78 and the soil, and/or the controller 88 is configured to determine the instructions to control the packer wheel actuator 100 based at least in part on a second determined contact force between the packer wheel 92 and the soil. For example, as discussed in detail below, the controller 88 may determine a target contact force between the row cleaner blade 78 and the soil based on soil condition(s), residue characteristics (e.g., coverage), trench closing effectiveness, or a combination thereof. Then, the controller 88 may control the row cleaner actuator 84 such that a determined contact force between the row cleaner blade 78 and the soil is maintained within a threshold range of the target contact force.

In the illustrated embodiment, a first downforce sensor 101 is configured to output a first input signal to the controller 88 indicative of a first determined contact force between the row cleaner blade 78 and the soil. The first downforce sensor 101 includes a fluid pressure sensor fluidly disposed between the first valve assembly 86 and the row cleaner actuator 84. The first downforce sensor 101 may monitor the pressure of the fluid supplied to the row cleaner actuator 84, thereby enabling the controller 88 to determine the downforce applied by the row cleaner blade 78 to the soil based on the monitored pressure. A second downforce sensor 103 configured to output a second input signal to the controller 88 indicative of a second determined contact force between the packer wheel 92 and the soil. In addition, the second downforce sensor 103 includes a fluid pressure sensor fluidly disposed between the second valve assembly 102 and the packer wheel actuator 100. The second downforce sensor 103 may monitor the pressure of the fluid supplied to the packer wheel actuator, thereby enabling the controller 88 to determine the downforce applied by the packer wheel 92 to the soil based on the monitored pressure.

While the first downforce sensor 101 and the second downforce sensor 103 include fluid pressure sensors in the illustrated embodiment, in other embodiments, the first downforce sensor and/or the second downforce sensor may include other suitable type(s) of sensor(s) configured to output respective input signal(s) indicative of the respective downforce (e.g., alone or in combination with the fluid pressure sensor). For example, in certain embodiments, at least one downforce sensor may include a torque sensor configured to monitor torque about the pivot joint of the respective arm. Furthermore, in certain embodiments, at least one downforce sensor may include a strain gauge configured to monitor a bending force within the respective arm. In addition, in certain embodiments, at least one downforce sensor may include a position sensor (e.g., ultrasonic transducer, capacitance sensor, inductance sensor, infrared sensor, radio frequency sensor, a sensor integrated within the respective actuator) configured to monitor an orientation of the respective arm relative to the frame. In such embodiments, the controller may determine the downforce based on the orientation of the respective arm (e.g., a lower position of the row cleaner blade/packer wheel may be indicative of a higher contact force, and a higher position of the row cleaner blade/packer wheel may be indicative of a lower contact force). Furthermore, in certain embodiments, at least one downforce sensor may be omitted, and the controller may provide open-loop control of the respective actuator.

As previously discussed, the controller 88 may determine a target contact force between the row cleaner blade 78 and the soil based on soil condition(s), residue characteristics, trench closing effectiveness, or a combination thereof. In addition, the controller 88 may determine a target contact force between the packer wheel 92 and the soil based on soil condition(s), residue characteristics, trench closing effectiveness, or a combination thereof. In the illustrated embodiment, a soil sensor 104 is configured to output a third input signal to the controller 88 indicative of a measured soil condition. In certain embodiments, the controller 88 is configured to determine the instructions to control the row cleaner actuator 84 and/or the packer wheel actuator 100 based at least in part on the measured soil condition. In the illustrated embodiment, the soil sensor 104 includes an electrical conductivity sensor mounted on the scraper 62 and configured to monitor the soil moisture content. For example, if the controller 88 determines that the soil moisture content is high, the controller 88 may reduce the target contact force for the row cleaner blade 78 to reduce disturbance to the soil by the row cleaner blade 78 and may reduce the target contact force for the packer wheel 92 to reduce compaction of the soil by the packer wheel 92. While the soil sensor 104 includes an electrical conductivity soil moisture content sensor in the illustrated embodiment, in other embodiments, the soil sensor may include another suitable type of soil moisture sensor, such as a non-contact electrostatic sensor. Furthermore, the soil sensor may include a sensor configured to monitor soil composition, soil firmness, soil density, or a combination thereof. Such sensors may include radio frequency transducer(s), infrared transducer(s), optical sensor(s) (e.g., camera(s)), LIDAR sensor(s), RADAR sensor(s), another suitable sensor type, or a combination thereof.

In the illustrated embodiment, a residue sensor 105 configured to output a fourth input signal to the controller 88 indicative of a measured residue coverage (e.g., percentage of a surface area covered by residue, approximate depth of the residue, and/or approximate density of the residue) forward of the row unit 30. In certain embodiments, the controller 88 is configured to determine the instructions to control the row cleaner actuator 84 and/or the packer wheel actuator 100 based at least in part on the measured residue coverage forward of the row unit 30. In the illustrated embodiment, the residue sensor 105 includes an optical sensor positioned proximate to the front portion of the row unit 30 relative to the direction of travel 18. The optical sensor is directed toward a region of the field forward of the row unit 30 along the direction of travel 18.

If the controller 88 determines that the residue coverage forward of the row unit 30 is high (e.g., percentage of the field covered with residue exceeds a threshold percentage), the controller may increase the target contact force for the row cleaner blade 78 (e.g., to a first higher target force) to increase residue removal and/or break up of the debris. If the controller 88 determines that the residue coverage forward of the row unit 30 is low (e.g., percentage of the field covered with residue is below the threshold percentage), the controller 88 may decrease the target contact force for the row cleaner blade 78 (e.g., to a second lower target force) to provide acceptable residue removal and/or break up of the debris while also limiting wear of components and/or drag on the row unit 30, for example. The controller 88 may adjust the target contact force for the row cleaner blade 78 on a sliding scale with the residue coverage (e.g., with the percentage; between a highest contact force and a lowest target contact force). The controller 88 may also utilize the depth of the residue and/or the density of the residue forward of the row unit 30 to determine the target contact force that provides the acceptable residue removal and/or break up of the debris.

The controller 88 may adjust the target contact force for the packer wheel 92 based on the residue coverage forward of the row unit 30. For example, if the residue coverage forward of the row unit is high, the controller 88 may decrease the target contact force for the packer wheel 92 to reduce compaction of the residue over the deposited agricultural product. While the residue sensor 105 includes an optical sensor in the illustrated embodiment, in other embodiments, the residue sensor may include another/additional suitable sensor configured to monitor residue coverage, such as a radio frequency transducer, an infrared transducer, a LIDAR sensor, or a RADAR sensor.

In the illustrated embodiment, a closing sensor 107 configured to output a fifth input signal to the controller 88 indicative of a measured residue coverage (e.g., percentage of a surface area covered by residue, approximate depth of the residue, and/or approximate density of the residue) rearward of the row unit 30. In certain embodiments, the controller 88 is configured to determine the instructions to control the row cleaner actuator 84 and/or the packer wheel actuator 100 based at least in part on the measured residue coverage rearward of the row unit 30 (e.g., at the trench). In the illustrated embodiment, the closing sensor 107 includes an optical sensor positioned proximate to the rear portion of the row unit 30 relative to the direction of travel 18. The optical sensor is directed toward a region of the field rearward of the row unit 30 along the direction of travel 18.

If the controller determines that a residue coverage in the trench rearward of the row unit 30 is high (e.g., percentage of the trench with residue exceeds a threshold percentage), the controller 88 may increase the target contact force for the row cleaner blade 78 (e.g., to a first higher target force) to increase the removal and/or break up of the debris. In some embodiments, the controller 88 may also adjust the orientation of the row cleaner blade 78 in an effort to divert the debris away from the packer wheel 92 and/or the trench. If the controller 88 determines that the residue coverage rearward of the row unit 30 is low (e.g., percentage of the field covered with residue is below the threshold percentage), the controller 88 may maintain and/or decrease the target contact force for the row cleaner blade 78 (e.g., to a second lower target force) to provide acceptable residue removal and/or break up of the debris while also limiting wear of components and/or drag on the row unit 30, for example. The controller 88 may adjust the target contact force for the row cleaner blade 78 on a sliding scale with the residue coverage (e.g., with the percentage; between a highest contact force and a lowest target contact force). The controller 88 may consider both the residue coverage forward of the row unit 30 and rearward of the row unit 30 to determine the target contact force for the row cleaner blade 78 (e.g., using one or more algorithms).

The controller 88 may also adjust the target contact force for the packer wheel 92 based on the residue coverage rearward of the row unit 30. For example, if the residue coverage rearward of the row unit 30 is high, the controller 88 may decrease the target contact force (e.g., from a first higher contact force to a second lower contact force) for the packer wheel 92 to reduce compaction of the residue over the deposited agricultural product. While the closing sensor 107 includes an optical sensor in the illustrated embodiment, in other embodiments, the closing sensor may include another/additional suitable sensor configured to monitor closing effectiveness, such as a radio frequency transducer, an infrared transducer, a LIDAR sensor, or a RADAR sensor.

The row unit 30 includes a spring assembly 106 configured to urge the opener disc 50 into engagement with the soil, to urge the gauge wheel 54 against the soil surface, and to facilitate upward vertical movement of the frame 42 (e.g., in response to contact between the opener disc 50 and an obstruction within the field). In the illustrated embodiment, the spring assembly 106 includes a bolt/tube assembly 108 that connects a lower trunnion 110 to an upper trunnion 112. The bolt/tube assembly 108 and lower trunnion 110 are surrounded by a compression spring 114. In addition, the spring assembly 106 is rotatably coupled to the lower link 38 by a fastener 116 to enable the spring assembly 106 to rotate relative to the lower link 38. In certain embodiments, a downforce actuator is configured to compress the spring assemblies of one or more row units (e.g., a group of row units). The force applied by the downforce actuator may be controlled to control the downforce applied by the gauge wheel 54 to the soil surface (e.g., while compressing the spring 114). In addition, the spring 114 is configured to compress to facilitate upward vertical movement of the frame 42 in response to the opener disc 50 or the gauge wheel 54 encountering an obstruction (e.g., rock, branch, etc.) within the field. While the row unit includes the spring assembly in the illustrated embodiment, in other embodiments, the spring assembly may be omitted. For example, in certain embodiments, the spring assembly may be omitted, and a downforce actuator may extend from the toolbar to the row unit (e.g., to the frame of the row unit, to a link of the linkage assembly, etc.).

In embodiments having downforce actuator(s) (e.g., configured to urge a group of row units downwardly and/or extending from the toolbar to the row unit), the controller may control the downforce actuator(s) to control the downforce applied by the gauge wheel to the soil surface. In certain embodiments, the downforce actuator(s) may include fluid actuator(s) (e.g., hydraulic cylinder(s), hydraulic motor(s), pneumatic cylinder(s), pneumatic motor(s)). Accordingly, the downforce applied by the gauge wheel to the soil may be increased by increasing the fluid pressure within the fluid actuator(s), and the downforce applied by the gauge wheel to the soil may be decreased by decreasing the fluid pressure within the fluid actuator(s). Furthermore, in such embodiments, a valve assembly may be fluidly coupled to the downforce actuator(s). The valve assembly may be configured to control the fluid pressure within the fluid actuator(s), thereby controlling the downforce applied by the gauge wheel to the soil. In addition, the controller may be communicatively coupled to the valve assembly. The controller may be configured to output an output signal to the valve assembly indicative of instructions to control the downforce actuator(s) (e.g., based on soil condition(s), residue coverage, trench closing effectiveness). While fluid actuator(s) are disclosed above, in other embodiments, the downforce actuator(s) may include other or alternative suitable actuator(s), such as electromechanical actuator(s), linear actuator(s), or electric motor(s). In such embodiments, the other/alternative actuator(s) may be directly communicatively coupled to the controller.

Because the row cleaner arm and the packer wheel arm are independently rotatably coupled to the frame of the row unit, the contact force between the packer wheel and the soil (e.g., the soil surface) may be controlled substantially independently of the contact force between the row cleaner blade and the soil. For example, the contact force between the row cleaner blade and the soil may be adjusted to a first value via the row cleaner actuator, and the contact force between the packer wheel and the soil may be adjusted to a second value via the packer wheel actuator. Each contact force may be adjusted for particular field conditions (e.g., soil composition, soil moisture, residue coverage). As a result, the row unit may effectively break up the debris to facilitate formation of the trench and may also effectively close the trench for a variety of field conditions.

In the illustrated embodiment, the row unit 30 including the row cleaner assembly 72 is a seeding/seeder row unit, as compared to a planting/planter row unit. Accordingly, a storage compartment (e.g., hopper, mini-hopper) for agricultural product is not non-movably coupled to the frame 42 (e.g., as compared to a planting/planter row unit that includes an agricultural product storage compartment, such as a hopper or a mini-hopper configured to receive agricultural product from a central storage compartment, non-movably coupled to the frame). In addition, the seeding/seeder row unit 30 includes a single opener disc 50 (e.g., as compared to a planting/planter row unit that includes a pair of opener discs arranged to form a v-shaped trench). Furthermore, in the illustrated embodiment, a metering device is not non-movably coupled to the frame of the row unit (e.g., as compared to a planting/planter row unit that includes a frame-mounted metering device, such as a vacuum seed meter). However, in other embodiments, a metering device (e.g., seed meter) may be non-movably coupled to the frame of the row unit.

Figure 3:
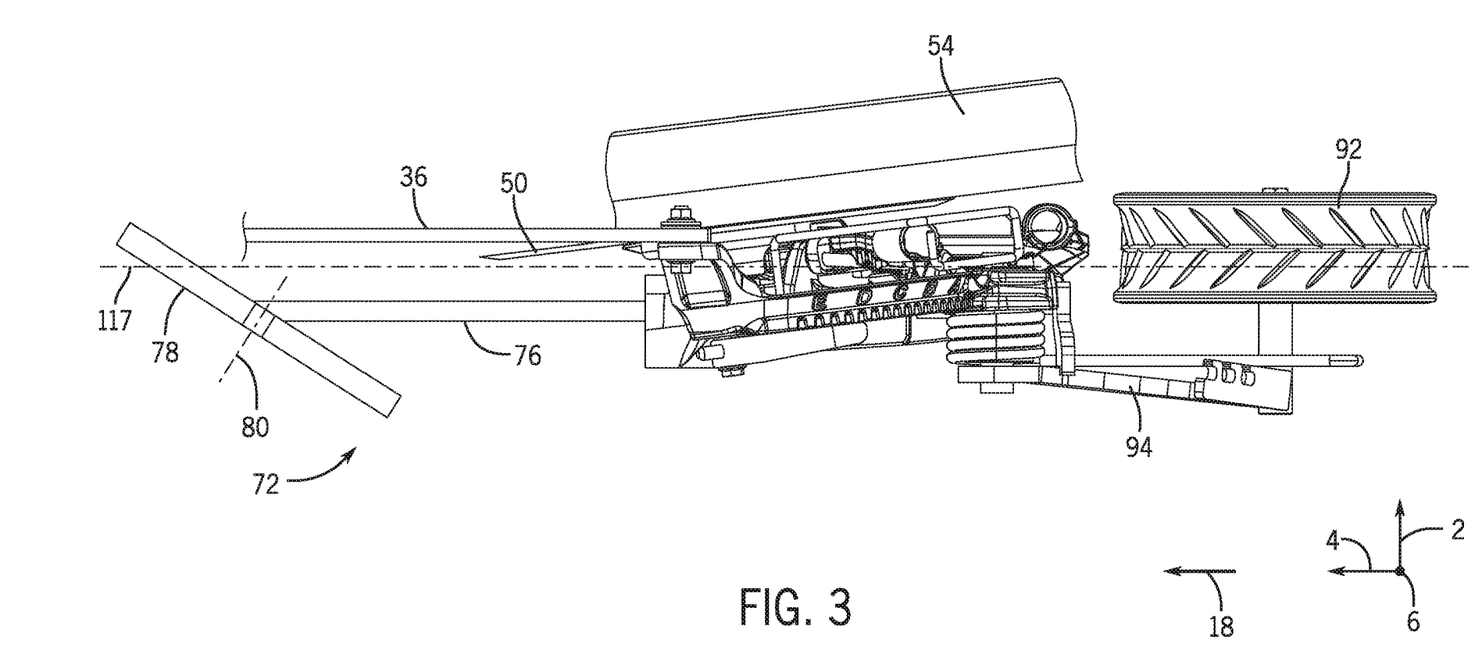
FIG. 3 is a top view of an embodiment of the row unit of FIG. 2.

FIG. 3 is a top view of an embodiment of the row unit 30. Certain components or portions of components (e.g., the linkage assembly 34 of FIG. 2) of the row unit 30 are omitted for image clarity. As shown, the row cleaner assembly 72 includes one row cleaner blade 78 rotatably mounted on the row cleaner arm 76 and positioned forward of the opener disc 50 along the direction of travel 18. The rotational axis 80 of the row cleaner blade 78 is oriented at an angle with respect to the lateral axis 2 such that a forward portion of the row cleaner blade 78 is closer to a center axis 117 of the row unit 30 as compared to a rearward portion of the row cleaner blade 78. In some embodiments, the forward portion of the row cleaner blade 78 overlaps with the opener disc 50 along the longitudinal axis 4 and/or the rearward portion of the row cleaner blade 78 overlaps with the scraper (see FIG. 2) to direct the residue away from the opener disc 50. In the illustrated embodiment, the row cleaner blade 78 is positioned to direct the residue to a first side of the row unit that is opposite a second side that supports the gauge wheel 54 to thereby block the broken residue from being diverted under the gauge wheel 54, which may affect the penetration depth of the opener disc 50. However, in some embodiments, the row cleaner blade 78 may be positioned to direct the residue to the second side that supports the gauge wheel 54 to thereby reduce the incidence of the broken residue clogging a space between the opener disc 50 and the scraper, for example.

As noted above, the row cleaner assembly 72 may include the single row cleaner blade 78, and the single row cleaner blade 78 may be angled at any orientation with respect to the lateral axis 2 and/or the vertical axis 6. Furthermore, the orientation may be adjustable by the operator or by the controller, such as based on the residue and/or soil parameters. Moreover, more than one row cleaner blade 78 may be provided, such as in a side-by-side configuration. In such cases, the row cleaner blades 78 may be arranged in a v-shape to enable the row cleaner blades 78 to divert the residue laterally-outwardly away from the opener disc 50.

Figure 4:
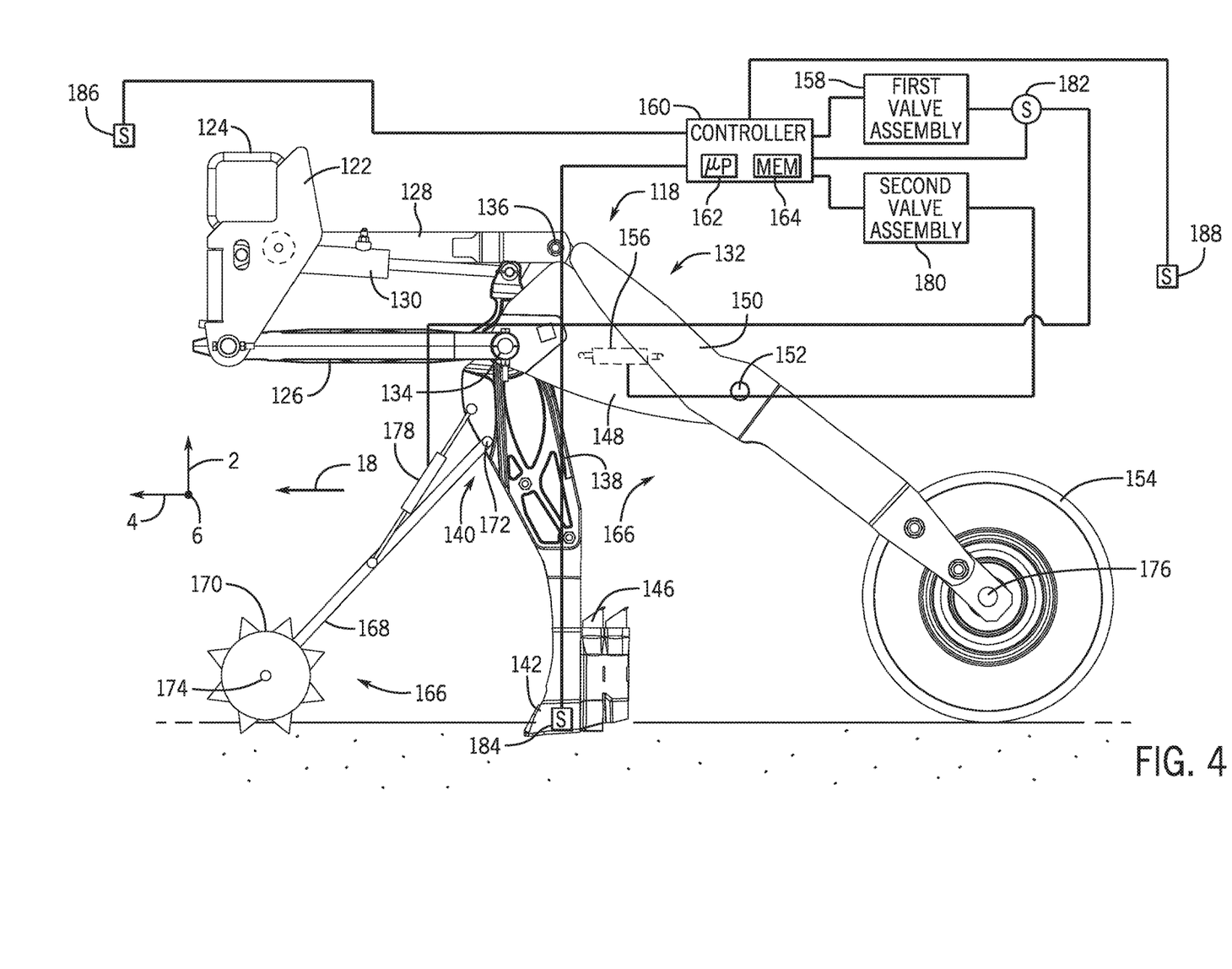
FIG. 4 is a side view of another embodiment of a row unit that may be employed within the agricultural seeding implement of FIG. 1.

FIG. 4 is a side view of another embodiment of a row unit 118 that may be employed within the agricultural seeding implement of FIG. 1. As illustrated, the row unit 118 includes a frame support 122 and a mounting bracket 124. The frame support 122 and the mounting bracket 124 are configured to interface with a toolbar, thereby securing the row unit 118 to the agricultural seeding implement frame. While the illustrated embodiment includes a single mounting bracket 124, in other embodiments, the row unit may include additional mounting brackets (e.g., 2, 3, 4, 5, 6, or more). Furthermore, while the illustrated row unit 118 is coupled to the toolbar by the frame support 122 and the mounting bracket(s) 124, in other embodiments, the row unit may be coupled to the toolbar by any other suitable connection system (e.g., fastener(s), a welded connection, an adhesive connection).

In addition, the row unit 118 includes a first linkage member 126, a second linkage member 128, and a biasing device, such as the illustrated downforce cylinder 130 (e.g., hydraulic or pneumatic piston-cylinder assembly). As illustrated, the first linkage member 126 (e.g., first link) and the second linkage member 128 (e.g., second link) extend from the frame support 122 to a packer wheel arm 132 of the closing system 120. The first linkage member 126 is pivotally coupled to the frame support 122, thereby pivotally coupling the first linkage member 126 to the toolbar of the agricultural seeding implement. In addition, the first linkage member 126 is pivotally coupled to the packer wheel arm 132 at a first pivot joint 134. In the illustrated embodiment, the second linkage member 128 is pivotally coupled to the frame support 122, thereby pivotally coupling the second linkage member 128 to the toolbar of the agricultural seeding implement. Furthermore, the second linkage member 128 is pivotally coupled to the packer wheel arm 132 at a second pivot joint 136. Accordingly, the first and second linkage members form a linkage (e.g., parallel linkage) between the frame support 122 and the packer wheel arm 132. While the linkage is formed by the first and second linkage members in the illustrated embodiment, in other embodiments, the packer wheel arm may be coupled to the frame support by any other suitable type of linkage (e.g., a linkage including only the first linkage member, a linkage including only the second linkage member).

The downforce cylinder 130 is pivotally coupled to the frame support 122 and to a shank 138 of an opener 140 (e.g., opener device). In addition, the shank 138 is pivotally coupled to the first linkage member 126 and to the packer wheel arm 132 at the first pivot joint 134. An opener blade 142 of the opener 140 is rigidly coupled (e.g., non-movably coupled, non-rotatably coupled, non-translatably coupled) to the shank 138 and configured to engage the soil. Applying pressurized fluid (e.g., hydraulic fluid, air) to the downforce cylinder 130 urges the packer wheel arm 132 and the opener 140 to translate downwardly. Translational movement of the packer wheel arm 132 and the opener 140 is controlled by the linkage. For example, the linkage may cause the packer wheel arm 132 and the opener 140 to translate along a vertical axis. While the illustrated embodiment utilizes a downforce cylinder 130 as the biasing member, in alternative embodiments, the row unit may include another suitable type of biasing member, such as a spring or a pneumatic strut, for example.

The opener blade 142 is configured to form a trench within the soil as the row unit 118 moves along the direction of travel 18. In the illustrated embodiment, the row unit 118 includes an agricultural product tube 146 (e.g., seed tube) configured to direct agricultural product into the trench formed by the opener blade 142. In the illustrated embodiment, the row unit 118 includes two agricultural product tubes 146 configured to deposit two agricultural products (e.g., two different agricultural products) into the soil. However, in other embodiments, the row unit may include more or fewer agricultural product tubes (e.g., 1, 2, 3, 4, or more).

In the illustrated embodiment, the packer wheel arm 132 includes a first portion 148 and a second portion 150 pivotally coupled to one another at a third pivot joint 152. The first portion 148 is pivotally coupled to the first linkage member 126 and to the second linkage member 128, and a packer wheel 154 is rotatably coupled to the second portion 150 of the packer wheel arm 132. The packer wheel 154 rotates along the soil surface to both pack the soil on top of deposited agricultural product and to control the penetration depth of the opener blade 142. In addition, the packer wheel arm 132 positions a rotational axis 176 of the packer wheel 154 rearward of the opener 140 relative to the direction of travel 18 of the row unit 118. In the illustrated embodiment, a packer wheel actuator 156 (e.g., first fluid actuator; hydraulic cylinder, hydraulic motor, pneumatic cylinder, pneumatic motor). is coupled to the first portion 148 and to the second portion 150 of the packer wheel arm 132. The packer wheel actuator 156 is configured to control a position of the packer wheel 154 relative to the opener 140 to control the penetration depth of the opener blade 142 within the soil. For example, the packer wheel actuator 156 may drive the second portion 150 of the packer wheel arm 132 to rotate upwardly relative to the first portion 148 of the packer wheel arm 132, thereby moving the packer wheel 154 upwardly relative to the opener 140. As a result, the penetration depth of the opener blade 142 may increase. In addition, the packer wheel actuator 156 may drive the second portion 150 of the packer wheel arm 132 to rotate downwardly relative to the first portion 148 of the packer wheel arm 132, thereby moving the packer wheel 154 downwardly relative to the opener 140. As a result, the penetration depth of the opener blade 142 may decrease.

In the illustrated embodiment, the row unit 118 includes a row cleaner assembly 166 configured to remove and/or break up debris forward of the opener 140. The row cleaner assembly 166 includes a row cleaner arm 168 and a row cleaner blade 170 rotatably coupled to the row cleaner arm 168. As illustrated, the row cleaner arm 168 is pivotally coupled to the shank 138 of the opener 140 at a fourth pivot joint 172, and the row cleaner arm 168 positions a rotational axis 174 of the row cleaner blade 170 forward of the opener blade 142 of the opener 140 relative to the direction of travel 18 of the row unit 118. While the row cleaner arm 168 is pivotally coupled to the shank 138 of the opener 140 in the illustrated embodiment, in other embodiments, the row cleaner arm may be pivotally coupled to another component of the row unit, such as the packer wheel arm 132, the first linkage member 126, the second linkage member 128, or the frame support 122, for example. The row cleaner assembly 166 may have any of the features discussed above with respect to FIGS. 1-3. For example, the row cleaner blade 170 may have teeth or be smooth. As another example, more than one row cleaner blade 170 may be provided (e.g., distributed along the direction of travel 18 or positioned side-by-side).

The row cleaner assembly 166 includes a row cleaner actuator 178 (e.g., first fluid actuator; hydraulic cylinder, hydraulic motor, pneumatic motor) coupled to the shank 138 of the opener 140 and to the row cleaner arm 168. The row cleaner actuator 178 is configured to control a downforce applied by the row cleaner blade 170 to the soil. Accordingly, the downforce applied by the row cleaner blade 170 to the soil may be increased by increasing the fluid pressure within the row cleaner actuator 178, and the downforce applied by the row cleaner blade 170 to the soil may be decreased by decreasing the fluid pressure within the row cleaner actuator 178. Furthermore, in the illustrated embodiment, the row unit 118 includes a first valve assembly 158 fluidly coupled to the row cleaner actuator 178. The first valve assembly 158 is configured to control the fluid pressure within the row cleaner actuator 178, thereby controlling the downforce applied by the row cleaner blade 170 to the soil. In addition, a controller 160, which is communicatively coupled to the first valve assembly 158, is configured to output a first output signal to the first valve assembly 158 indicative of instructions to control the row cleaner actuator 178.

Additionally, in the illustrated embodiment, the row unit 118 includes a second valve assembly 180 fluidly coupled to the packer wheel actuator 156. The second valve assembly 180 is configured to control the fluid pressure within the packer wheel actuator 156, thereby controlling the penetration depth of the blade. The controller 160 is communicatively coupled to the second valve assembly 180 and is configured to output a second output signal to the second valve assembly 180 indicative of instructions to control the packer wheel actuator 156. In certain embodiments, the controller 160 is an electronic controller that includes a processor, such as the illustrated microprocessor 162, and a memory device 164.

The controller 160 is configured to control the row cleaner actuator 178 in the same manner as discussed above with respect to FIGS. 1-3. Similarly, the controller 160 is configured to control the packer wheel actuator 156 in the same manner as discussed above with respect to FIGS. 1-3. For example, the controller 160 may determine a target contact force between the row cleaner blade 170 and the soil based on soil condition(s), residue coverage, trench closing effectiveness, or a combination thereof. The controller 160 may control the row cleaner actuator 178 such that the determined contact force between the row cleaner blade 170 and the soil is within a threshold range of the target contact force. Furthermore, the row cleaner blade 170 may have any of features as discussed above with respect to FIGS. 1-3. For example, the row cleaner blade 78 may be positioned at an angle to divert the residue to one side of the opener and/or the row cleaner blade 78 may include more than one row cleaner blade 78 (e.g., in a v-shape arrangement).

To facilitate these techniques, the row unit 118 includes a downforce sensor 182 configured to output a first input signal to the controller 160 indicative of the determined contact force. In the illustrated embodiment, the downforce sensor 182 includes a fluid pressure sensor fluidly disposed between the first valve assembly 158 and the row cleaner actuator 178. The downforce sensor 182 may monitor the pressure of the fluid supplied to the row cleaner actuator, thereby enabling the controller to determine the downforce applied by the row cleaner blade 170 to the soil based on the monitored pressure.

Furthermore, in the illustrated embodiment, the row unit 118 includes a soil sensor 184 configured to output a second input signal to the controller 160 indicative of a measured soil condition. In certain embodiments, the controller 160 is configured to determine the instructions to control the row cleaner actuator 178 based at least in part on the measured soil condition. In the illustrated embodiment, the row unit 118 includes a residue sensor 186 configured to output a third input signal to the controller 160 indicative of a measured residue coverage forward of the row unit 118. In certain embodiments, the controller 160 is configured to determine the instructions to control the row cleaner actuator 178 based at least in part on the measured residue coverage forward of the row unit 118. In the illustrated embodiment, the row unit 118 includes a closing sensor 188 configured to output a fourth input signal to the controller 160 indicative of a measured residue coverage rearward of the row unit 118 (e.g., at the trench). In certain embodiments, the controller 160 is configured to determine the instructions to control the row cleaner actuator 178 based at least in part on the measured residue coverage rearward of the row unit 118.

Furthermore, in the illustrated embodiment, the packer wheel actuator 156 is configured to control the vertical position of the packer wheel 154 relative to the opener 140 to control the penetration depth of the opener blade 142 of the opener 140 within the soil. The controller 160 is configured to output the second output signal to the second valve assembly 180 indicative of instructions to control the blade penetration depth. In certain embodiments, the controller 160 may determine a target penetration depth of the blade based on soil condition(s) (e.g., as determined based on feedback from the soil sensor 184), residue coverage (e.g., as determined based on feedback from the residue sensor 186), trench closing effectiveness (e.g., as determined based on feedback from the closing sensor 188), or a combination thereof. For example, if the controller determines that the soil moisture content is high, the controller may reduce the target penetration depth. If the controller determines that the soil moisture content is low, the controller may increase the target penetration depth. Furthermore, if the controller determines that the residue coverage is high (e.g., percentage of the field covered with residue), the controller may increase the target penetration depth. If the controller determines that the residue coverage is low (e.g., percentage of the field covered with residue), the controller may decrease the target penetration depth. Once the target penetration depth is determined, the controller 160 may control the packer wheel actuator 156 such that a penetration depth of the opener blade 142 within the soil (e.g., as determined based on feedback from one or more penetration depth sensors, such as an angle sensor configured to measure the angle of the second portion of the packer wheel arm relative to the first portion of the packer wheel arm, electrical conductivity sensor coupled to the blade) is within a threshold range of the target penetration depth.

As previously discussed, the row unit 118 includes the downforce cylinder 130 configured to urge the packer wheel arm 132 and the opener 140 to translate downwardly. Accordingly, the downforce cylinder 130 may control the contact force between the packer wheel 154 and the soil (e.g., the soil surface). For example, the downforce applied by the packer wheel to the soil may be increased by increasing the fluid pressure within the downforce cylinder, and the downforce applied by the packer wheel to the soil may be decreased by decreasing the fluid pressure within the downforce cylinder 130. Furthermore, a valve assembly may be fluidly coupled to the downforce cylinder 130. The valve assembly may be configured to control the fluid pressure within the downforce cylinder 130, thereby controlling the downforce applied by the packer wheel 154 to the soil. In addition, the controller 160 may be communicatively coupled to the valve assembly. The controller 160 may be configured to output an output signal to the valve assembly indicative of instructions to control the downforce cylinder 130 (e.g., based on soil condition(s), residue coverage, trench closing effectiveness). In certain embodiments, the controller 160 may determine a target contact force between the packer wheel 154 and the soil based on soil condition(s) (e.g., as determined based on feedback from the soil sensor 184), residue coverage (e.g., as determined based on feedback from the residue sensor 186), trench closing effectiveness (e.g., as determined based on feedback from the closing sensor 188), or a combination thereof.

By way of example, if the controller determines that the soil moisture content is high, the controller may reduce the target contact force to reduce compaction of the soil. If the controller determines that the soil moisture content is lower, the controller may increase the target contact force to cause the packer wheel to maintain contact with the soil during operation of the row unit. Furthermore, if the controller determines that the residue coverage is high (e.g., percentage of the field covered with residue), the controller may increase the target contact force to increase closing effectiveness. If the controller determines that the residue coverage is low (e.g., percentage of the field covered with residue), the controller may decrease the target contact force to reduce compaction. Once the target contact force is determined, the controller may control the downforce cylinder such that a determined contact force between the packer wheel and the soil (e.g., as determined based on feedback from a downforce sensor, such as a fluid pressure sensor fluidly disposed between the valve assembly and the downforce cylinder, torque sensor, position sensor) is within a threshold range of the target contact force.

The row cleaner actuator 178 enables the contact force between the row cleaner blade 170 and the soil to be controlled substantially independently of the contact force between the packer wheel 154 and the soil (e.g., the soil surface). For example, the contact force between the packer wheel and the soil may be adjusted to a first value by controlling the fluid pressure within the downforce cylinder 130, and the contact force between the row cleaner blade and the soil may be adjusted to a second value by controlling the fluid pressure within the row cleaner actuator 178. Each contact force may be adjusted for particular field conditions (e.g., soil composition, soil moisture, residue coverage).

In the illustrated embodiment, the row unit 118 including the row cleaner assembly 166 is a seeding/seeder row unit, as compared to a planting/planter row unit. Accordingly, a storage compartment (e.g., hopper, mini-hopper) for agricultural product is not non-movably coupled to the frame (e.g., as compared to a planting/planter row unit that includes an agricultural product storage compartment, such as a hopper or a mini-hopper configured to receive agricultural product from a central storage compartment, non-movably coupled to the frame). In addition, the seeding/seeder row unit 118 may include a single opener 140 (e.g., as compared to a planting/planter row unit that includes a pair of opener discs arranged to form a v-shaped trench). Furthermore, in the illustrated embodiment, a metering device is not non-movably coupled to the frame of the row unit 118 (e.g., as compared to a planting/planter row unit that includes a frame-mounted metering device, such as a vacuum seed meter). However, in other embodiments, a metering device (e.g., seed meter) may be non-movably coupled to the frame of the row unit.

While the row units disclosed above with reference to FIGS. 1-4 include a single opener, in other embodiments, at least one row unit may include multiple openers (e.g., 2, 3, 4, or more). In the embodiments disclosed above with reference to FIGS. 1-4, the controller may control the actuator(s) based on feedback from the downforce sensor(s), the soil sensor, the residue sensor, the closing sensor, other suitable sensor(s), or a combination thereof. However, in other embodiments, the controller may control the actuator(s) based on feedback from other suitable sources (e.g., alone or in combination with the feedback from the sensors). For example, in certain embodiments, the seeding implement may include a spatial locating device (e.g., a global positioning system receiver) configured to output a signal indicative of the position of the seeding implement. In such embodiments, the controller may be configured to determine the position of the seeding implement based on the feedback from the spatial locating device, and control the actuator(s) based on the position of the seeding implement and a map (e.g., yield map, residue map, soil moisture map) of the field. While the controller is configured to determine the target contact forces based on sensor input in the illustrated embodiment (e.g., automatically, without operator input; as part of autonomous farming operations), it should be appreciated that at least one target contact force may be manually input (e.g., via a user interface communicatively coupled to the controller).

While certain embodiments of the row units disclosed above with reference to FIGS. 1-4 include multiple actuators (e.g., to control the contact force between the row cleaner blade(s) and the soil, to control the contact force between the packer wheel and the soil), at least one row unit of the embodiments disclosed above may have fewer actuators. For example, at least one actuator of at least one row unit of the embodiments disclosed above may be replaced with a biasing element, and in certain embodiments a force/torque adjustment device configured to control the force/torque applied by the biasing element.

While only certain features have been illustrated and described herein, many modifications and changes will occur to those skilled in the art. It is, therefore, to be understood that the appended claims are intended to cover all such modifications and changes as fall within the true spirit of the disclosure. Furthermore, features shown and described with reference to FIGS. 1-4 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A row unit of a seeder, comprising:
   a frame configured to be coupled to a toolbar of the seeder;
   a single opener pivotally or rotatably coupled to the frame;
   a row cleaner assembly, comprising:
      a row cleaner arm pivotally coupled to the frame or to the single opener;
      a row cleaner blade rotatably coupled to the row cleaner arm, wherein the row cleaner arm positions a respective rotational axis of the row cleaner blade forward of the single opener relative to a direction of travel of the row unit, and the respective rotational axis of the row cleaner blade is oriented at an angle relative to a lateral axis of the row unit; and
      a row cleaner actuator coupled to the row cleaner arm, wherein the row cleaner actuator is configured to control a first downforce applied by the row cleaner blade to soil;
   a packer wheel assembly, comprising:
      a packer wheel arm pivotally coupled to the frame, wherein the packer wheel arm and the row cleaner arm are configured to pivot independently of one another relative to the frame;
      a packer wheel rotatably coupled to the packer wheel arm, wherein the packer wheel arm positions a respective rotational axis of the packer wheel rearward of the single opener relative to the direction of travel of the row unit; and
      a packer wheel actuator coupled to the frame and to the packer wheel arm, wherein the packer wheel actuator is configured to control a second downforce applied by the packer wheel to the soil; and
   a controller configured to:
      receive a signal indicative of a residue characteristic of residue in a field;
      determine a first downforce target range for the row cleaner blade based on the residue characteristic of the residue in the field;
      determine a second downforce target range for the packer wheel based on the residue characteristic of the residue in the field;
      receive a first downforce signal indicative of the first downforce applied by the row cleaner blade to the soil;
      receive a second downforce signal indicative of the second downforce applied by the packer wheel to the soil;

control the row cleaner actuator to adjust the first downforce applied by the row cleaner blade to the soil to be within the first downforce target range; and control the packer wheel actuator to adjust the second downforce applied by the packer wheel to the soil to be within the second downforce target range.

2. The row unit of claim 1, wherein the single opener comprises a shank that is pivotally coupled to the frame.

3. The row unit of claim 2, wherein the row cleaner arm is pivotally coupled to the shank, and the row cleaner actuator is pivotally coupled to the shank.

4. The row unit of claim 1, wherein the single opener comprises an opener disc that is rotatably coupled to the frame.

5. The row unit of claim 1, wherein the row cleaner actuator comprises a first fluid actuator.

6. The row unit of claim 1, wherein the respective rotational axis of the row cleaner blade is oriented at the angle with respect to the lateral axis such that a forward portion of the row cleaner blade is closer to a center axis of the row unit as compared to a rearward portion of the row cleaner blade.

7. A seeder implement, comprising:
a toolbar;
a plurality of row units, wherein a first row unit of the plurality of row units comprises:
a frame coupled to the toolbar of the seeder implement;
an opener pivotally or rotatably coupled to the frame;
a row cleaner assembly, comprising:
a row cleaner arm pivotally coupled to the frame or to the opener;
a row cleaner blade rotatably coupled to the row cleaner arm;
a row cleaner actuator coupled to the row cleaner arm, wherein the row cleaner actuator is configured to control a first downforce applied by the row cleaner blade to soil in a field;
a packer wheel assembly, comprising:
a packer wheel arm pivotally coupled to the frame;
a packer wheel rotatably coupled to the packer wheel arm; and
a packer wheel actuator coupled to the packer wheel arm, wherein the packer wheel actuator is configured to control a second downforce applied by the packer wheel to the soil in the field; and
a controller configured to:
receive a signal indicative of a residue characteristic of residue in the field;
determine a first target downforce range for the row cleaner blade based on the residue characteristic of the residue in the field;
determine a second downforce target range for the packer wheel based on the residue characteristic of the residue in the field;
receive a first downforce signal indicative of the first downforce applied by the row cleaner blade to the soil;
receive a second downforce signal indicative of the second downforce applied by the packer wheel to the soil;
output a first control signal to adjust the row cleaner actuator to maintain the first downforce applied by the row cleaner blade to the soil in the field within the first target downforce range; and
output a second control signal to adjust the packer wheel actuator to maintain the second downforce applied by the packer wheel to the soil in the field within the second target downforce range.

8. The seeder implement of claim 7, wherein the opener comprises a shank that is pivotally coupled to the frame.

9. The seeder implement of claim 8, wherein the row cleaner arm is pivotally coupled to the shank.

10. The seeder implement of claim 7, wherein the opener comprises an opener disc that is rotatably coupled to the frame.

11. The seeder implement of claim 10, wherein the row cleaner arm is pivotally coupled to the frame.

12. The seeder implement of claim 7, comprising an additional toolbar rearward of the toolbar relative to a direction of travel, wherein a second row unit of the plurality of row units comprises:
a respective frame coupled to the additional toolbar of the seeder implement;
a respective opener pivotally or rotatably coupled to the respective frame;
a respective row cleaner assembly, comprising:
a respective row cleaner arm pivotally coupled to the respective frame or to the respective opener;
a respective row cleaner blade rotatably coupled to the respective row cleaner arm;
a respective row cleaner actuator coupled to the respective row cleaner arm, wherein the respective row cleaner actuator is configured to control a third downforce applied by the respective row cleaner blade to the soil in the field;
a respective packer wheel assembly, comprising:
a respective packer wheel arm pivotally coupled to the frame;
a respective packer wheel rotatably coupled to the packer wheel arm; and
a respective packer wheel actuator coupled to the respective packer wheel arm, wherein the respective packer wheel actuator is configured to control a fourth downforce applied by the respective packer wheel to the soil in the field.

13. A method of operating a row unit for a seeder, the method comprising:
linking a frame of the row unit to a toolbar of the seeder;
positioning a single opener in contact with soil in a field, wherein the single opener is pivotally or rotatably coupled to the frame;
positioning a row cleaner blade in contact with the soil in the field, wherein the row cleaner blade is rotatably coupled to a row cleaner arm, and the row cleaner arm is pivotally coupled to the frame or to the single opener;
receiving sensor signals indicative of a plurality of characteristics, wherein the plurality of characteristics comprises respective residue characteristics of residue forward of the row unit, respective residue characteristics of residue rearward of the row unit, and one or more soil conditions of the soil in the field;
determining a first downforce target range for the row cleaner blade based on the plurality of characteristics;
controlling a valve assembly to adjust a flow and/or a pressure of fluid to a row cleaner actuator that is coupled to the row cleaner arm to thereby adjust a first downforce applied by the row cleaner blade to the soil in the field to be within the first downforce target range;
determining a second downforce target range for a packer wheel based on the plurality of characteristics; and
controlling an additional valve assembly to adjust a respective flow and/or a respective pressure of fluid to a packer wheel actuator that is coupled to a packer wheel arm that supports the packer wheel to thereby adjust a second downforce applied by the packer wheel to the soil in the field to be within the second downforce target range.

14. The method of claim 13, wherein the one or more soil conditions comprise soil moisture content, soil composition, soil firmness, or any combination thereof.

* * * * *